United States Patent
Martin et al.

(10) Patent No.: US 11,047,819 B2
(45) Date of Patent: Jun. 29, 2021

(54) NONDESTRUCTIVE MULTISPECTRAL VIBROTHERMOGRAPHY INSPECTION SYSTEM AND METHOD THEREFOR

(71) Applicant: United Technologies Corporation, Farmington, CT (US)

(72) Inventors: Thomas J. Martin, East Hampton, CT (US); Alexander Staroselsky, Avon, CT (US); Alan Matthew Finn, Hebron, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 548 days.

(21) Appl. No.: 15/904,966

(22) Filed: Feb. 26, 2018

(65) Prior Publication Data

US 2019/0265178 A1    Aug. 29, 2019

(51) Int. Cl.
*G01N 25/72* (2006.01)
*G01N 29/12* (2006.01)
(Continued)

(52) U.S. Cl.
CPC ........... *G01N 25/72* (2013.01); *G01N 29/043* (2013.01); *G01N 29/069* (2013.01);
(Continued)

(58) Field of Classification Search
CPC ......... G06T 7/0002; G06T 2207/10048; G06T 2207/30156; G06T 7/0004;
(Continued)

(56) References Cited

U.S. PATENT DOCUMENTS 7,064,330 B2    6/2006 Raulerson et al.
7,119,338 B2   10/2006 Thompson et al.
(Continued)

FOREIGN PATENT DOCUMENTS

CN    107451616 A  * 12/2017
GB      2545271 A     6/2017
WO    2014207545 A1  12/2014

OTHER PUBLICATIONS

European Search Report dated Jul. 23, 2019 issued for corresponding European Patent Application No. 19159151.0.
(Continued)

*Primary Examiner* — Lisa M Caputo
*Assistant Examiner* — Janice M Soto
(74) *Attorney, Agent, or Firm* — Bachman & LaPointe, P.C.

(57) ABSTRACT

A nondestructive multispectral vibrothermography inspection system includes a fixture to retain a component, an ultrasonic excitation source directed toward the component retained within the fixture, a laser Doppler vibrometer directed toward the component retained within the fixture, and a multispectral thermography system directed toward the component retained within the fixture. A method for nondestructive multispectral vibrothermography inspection of a component, includes generating ultrasonic excitations in a component over a broad range of frequencies; determining a spectral signature in the component from the excitations; comparing the spectral energy signature against database 270 of correlations between vibrational frequencies of a multiple of components and the spectral energy distribution thereof, and classifying the component based on the database data.

14 Claims, 6 Drawing Sheets

(51) Int. Cl.
| | |
|---|---|
| *G01N 29/22* | (2006.01) |
| *G01N 29/46* | (2006.01) |
| *G01N 29/24* | (2006.01) |
| *G01N 29/04* | (2006.01) |
| *G01N 29/44* | (2006.01) |
| *G01N 29/07* | (2006.01) |
| *G01N 29/06* | (2006.01) |
| *G01N 29/50* | (2006.01) |

(52) U.S. Cl.
CPC ......... *G01N 29/0672* (2013.01); *G01N 29/07* (2013.01); *G01N 29/12* (2013.01); *G01N 29/228* (2013.01); *G01N 29/2418* (2013.01); *G01N 29/4445* (2013.01); *G01N 29/4454* (2013.01); *G01N 29/4481* (2013.01); *G01N 29/46* (2013.01); *G01N 29/50* (2013.01); G01N 2291/0231 (2013.01); G01N 2291/0237 (2013.01); G01N 2291/0258 (2013.01); G01N 2291/103 (2013.01); G01N 2291/2694 (2013.01)

(58) Field of Classification Search
CPC .... G01N 21/8851; G01N 25/72; G01N 21/71; G01N 29/46; G01N 29/2418; G01N 29/043; G01N 29/4454; G01N 29/07; G01N 29/4481; G01N 29/069; G01N 29/50; G01N 29/0672; G01N 29/4445; G01N 29/12; G01N 29/228; G01N 2291/0258; G01N 2291/103; G01N 2291/0237; G01N 2291/0231; G01N 2291/2694

See application file for complete search history.

(56) References Cited

U.S. PATENT DOCUMENTS

| | | | |
|---|---|---|---|
| 7,122,801 | B2 | 10/2006 | Favro et al. |
| 7,220,966 | B2* | 5/2007 | Saito .................. G01N 25/72 |
| | | | 250/341.6 |
| 7,966,883 | B2 | 6/2011 | Lorraine et al. |
| 9,519,844 | B1* | 12/2016 | Thompson ........... G01J 5/0003 |
| 2005/0151083 | A1* | 7/2005 | Favro .................. G01N 29/345 |
| | | | 250/341.6 |
| 2009/0252987 | A1 | 10/2009 | Greene, Jr. |
| 2012/0007979 | A1* | 1/2012 | Schneider ........... G06K 9/0063 |
| | | | 348/116 |
| 2012/0207401 | A1* | 8/2012 | Archer .................. G02B 27/48 |
| | | | 382/254 |

OTHER PUBLICATIONS

Montanini R et al: "Quantitative evaluation of hidden defects in cast iron components using ultrasound activated lock-in vibrothermography", Review of Scientific Instruments, AIP, Melville, NY, US, vol. 83, No. 9, Sep. 1, 2012, pp. 094902-1-094902-7, XP012162648, ISSN: 0034-6748, DOI: 10.1063/1.4750977.

Kylili Angeliki et al: "Infrared thermography (IRT) applications for building diagnostics: A review", Applied Energy, Elsevier Science Publishers, GB, vol. 134, Sep. 6, 2014, pp. 531-549, XP029059953, ISSN: 0306-2619, DOI: 10.1016/J.Apenergy.2014.08.005.

* cited by examiner

NONDESTRUCTIVE MULTISPECTRAL VIBROTHERMOGRAPHY INSPECTION SYSTEM AND METHOD THEREFOR

BACKGROUND

The present disclosure relates to nondestructive component inspection and, more particularly, to a nondestructive multispectral vibrothermography inspection system for prognostics and health management, preventative maintenance, and repair of engine parts.

Gas turbine engines typically include a compressor section to pressurize airflow, a combustor section to burn a hydrocarbon fuel in the presence of the pressurized air, and a turbine section to extract energy from the resultant combustion gases. Gas path components, such as turbine blades, often include airfoil cooling that may be accomplished by external film cooling, internal air impingement, and forced convection either separately, or in combination.

Hot section turbine components in aircraft and industrial gas turbine engines are protected by thermal barrier coatings (TBCs) that provide thermal insulation against high temperatures, and by environmental barrier coatings (EBCs) that provide resistance to environmental attack such as that due to oxidation, corrosion, and recession. TBCs have been used to protect metallic components, especially those constructed from nickel-based superalloys in the hot section of gas turbine engines, such as turbine blades, vanes, endwalls, air seals, and combustor liners. TBCs allow for higher gas temperature operation by protecting components exposed to high temperature gases from thermally activated damage such as melting, creep, oxidation, corrosion, and cyclic thermo-mechanical fatigue. Use of TBCs result in improved fuel consumption, increased thrust or power generation, reduced emissions, improved reliability, reduced cooling requirements, and reduced cost by extending service life and time between maintenance.

Thermal protection is typically provided by a ceramic top coat. Coatings are often multilayered systems that include a thermally insulating and porous ceramic topcoat applied on top of various interface and EBC layers that provide additional environmental protection, as well as bonding to the metal alloy substrate. The EBCs and TBCs are considered to be prime reliant, hence monitoring their health and determining if they have failed, or when they will fail, is important. Conventional maintenance strategies of TBC coated components may be expensive and entail risks because they involve stripping of the coating, visual/manual inspections (sometimes robot-assisted), and involve scanning or imaging to determine if the component is to be scrapped or refurbished by machining, milling, welding and laser cladding, and recoating.

The maintenance, repair, and overhaul (MRO) of TBC coated components are performed as corrective actions on an as-needed basis, and as preventative maintenance based on engine operating time or number of cycles. Other MRO strategies have been proposed that are based on forecasting of component degradation, prediction of remaining useful life, maintenance scheduled by the actual condition of the component rather than based on time or numbers of cycles, and prognostic health monitoring during the entire life cycle of the components. The intent is to realize improvements in engine availability at reduced risk and cost. These solutions require advanced model-based predictions, algorithms that can diagnose failure (which must be specifically developed), along with appropriate data collection systems. However, the determination of remaining useful life requires knowledge about the material state of the components, which is dependent on the evolving damage state.

Prognostic systems must be able to determine both the TBC and substrate material state over time in order to estimate the probability of modeled failure modes, exceedance of detection thresholds, and the associated uncertainty. The prognostic system must make careful decisions to take appropriate actions that do not miss mission-critical failure modes and yet minimize false alarms. Remote and nondestructive inspection (NDI) of hot section turbine components coated with TBCs is a long sought-after technology. Advances in optics, data integration, and analysis techniques have led to the development of many NDI techniques for hot section components, such as vibrothermography for crack detection (also known as ultrasonic infrared thermography, acoustic thermography, thermosonics, thermo acoustic imaging, or sonic IR), flash thermography to detect delamination and flaws, computed tomography (CT) scans, laser-induced luminescence spectroscopy, topographical optical sensors, and the like. Generally, these techniques require the stripping and re-application of the TBC, which can be expensive and time-consuming processes and result in the refurbishment being costlier than component replacement. Stripping and reapplication may also have the potential for component damage due to media blast processes and may impose difficult work environments due to solvents and surface treatments.

Further, these processes can be very inefficient, and are entirely wasteful if the component passes the inspections and is found to be in good condition after its coating has already been stripped.

Vibrothermography is a family of nondestructive inspection methods that monitor heat generated at damage sites under vibration or ultrasonic excitation. Although vibrothermography has shown promise for finding cracks, these methods may fail to detect key characteristics of crack morphology, subsurface cracks, and cracks underneath coatings, because the diffusion of heat and the infrared thermal signal is very weak and dominated by sensor noise.

SUMMARY

A nondestructive multispectral vibrothermography inspection system to inspect a component without removal of a coating thereon according to one disclosed non-limiting embodiment of the present disclosure includes a fixture to retain a component; an ultrasonic excitation source directed toward the component to generate ultrasonic excitations in the component over one or more of a plurality of frequencies; a sensor directed toward the component to measure the natural vibrational modes of the component as surface velocity generated by the ultrasonic excitations; a multispectral thermography system directed toward the component to determine a spectral signature in the component from the excitations; and a controller operable to classify the component based on a correlation between the surface velocities from the excitations and the spectral signature in the component from the excitations.

A further embodiment of any of the foregoing embodiments of the present disclosure includes that the one or more of a plurality of frequencies comprise a range of frequencies.

A further embodiment of any of the foregoing embodiments of the present disclosure includes dampers that minimize the effect of the fixture in response to ultrasonic excitation from the ultrasonic excitation source.

A further embodiment of any of the foregoing embodiments of the present disclosure includes that the range of frequencies are from 20 kHz to 2 MHz.

A further embodiment of any of the foregoing embodiments of the present disclosure includes that the multispectral thermography system is operable to view radiation over the range of the spectral signature.

A further embodiment of any of the foregoing embodiments of the present disclosure includes that the spectral signature is from 0.5 to 14.5 µm in wavelength.

A further embodiment of any of the foregoing embodiments of the present disclosure includes a database of the correlations between vibrational frequencies of a multiple of components and the spectral energy distribution thereof.

A further embodiment of any of the foregoing embodiments of the present disclosure includes that the database of the correlations is utilized to determine acceptable and unacceptable components.

A further embodiment of any of the foregoing embodiments of the present disclosure includes that the database of the correlations is utilized to score a component being inspected.

A further embodiment of any of the foregoing embodiments of the present disclosure includes an airfoil as the component.

A further embodiment of any of the foregoing embodiments of the present disclosure includes an image recognition algorithm to match the spectral signature of the component against a database that contains multispectral images of previously inspected components known to have either failed or passed the inspection.

A further embodiment of any of the foregoing embodiments of the present disclosure includes a plurality of a near infrared (NIR) module, a short-wave infrared (SWIR) module, a mid-wave infrared (MWIR) module, a long-wave infrared (LWIR) module, and a very long-wave infrared (VLWIR) module.

A further embodiment of any of the foregoing embodiments of the present disclosure includes one or more beam splitters to view the component through a single lens.

A method for nondestructive multispectral vibrothermography inspection of a component without removal of a coating thereon according to one disclosed non-limiting embodiment of the present disclosure includes generating ultrasonic excitations in a component over one or more of a plurality of frequencies; determining a spectral signature in the component from the excitations; and classifying the component based on the spectral signature.

A further embodiment of any of the foregoing embodiments of the present disclosure includes determining a correlation between the surface velocities from the excitations and the spectral signature in the component from the excitations; comparing the correlation against a multiple of correlations; and classifying the component based on the comparing.

A further embodiment of any of the foregoing embodiments of the present disclosure includes identifying whether the component is acceptable or unacceptable.

A further embodiment of any of the foregoing embodiments of the present disclosure includes scoring the component.

A further embodiment of any of the foregoing embodiments of the present disclosure includes damping the component within a fixture.

A further embodiment of any of the foregoing embodiments of the present disclosure includes frequencies from 20 kHz to 2 MHz.

A further embodiment of any of the foregoing embodiments of the present disclosure includes that the spectral signature is from 0.5 to 22 µm in wavelength.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
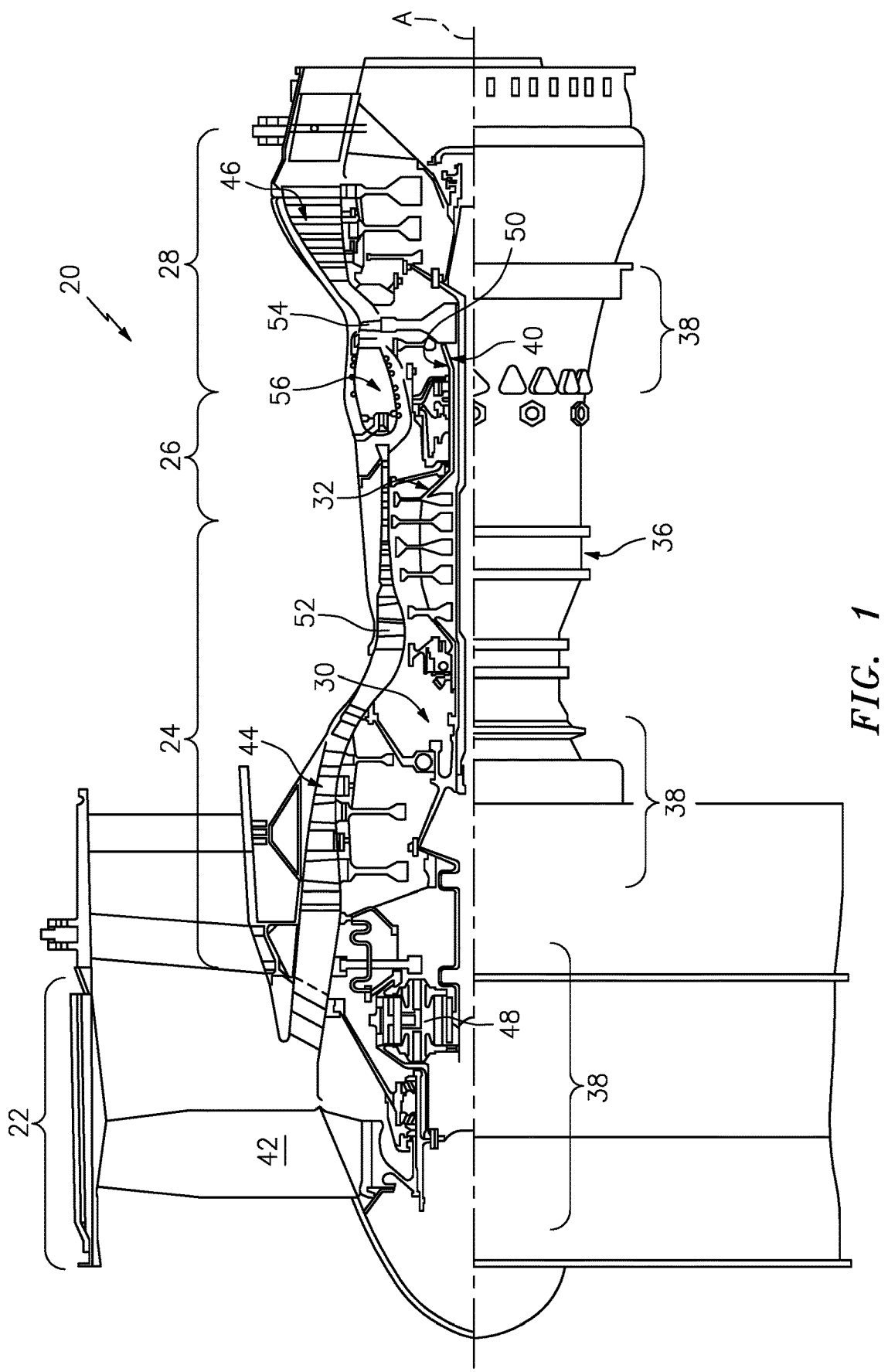
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and along a core flowpath for compression by the compressor section 24, communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engine architectures, other turbo machinery, and machinery components in general.

The engine 20 generally includes a low spool 30 and a high spool 32 mounted for rotation about an engine central longitudinal axis "A". The low spool 30 generally includes an inner shaft 40 that interconnects a fan 42, a low pressure compressor ("LPC") 44 and a low pressure turbine ("LPT") 46. The inner shaft 40 drives the fan 42 directly, or through a geared architecture 48 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis "A," which is collinear with their longitudinal axes.

Core airflow is compressed by the LPC 44, then the HPC 52, mixed with the fuel and burned in the combustor 56, then expanded over the HPT 54, then the LPT 46. The turbines 54, 46 rotationally drive the respective high spool 32 and low spool 30 in response to the expansion. The main engine shafts 40, 50 are supported at a plurality of points by bearing structures 38 within the engine case structure 36.

Figure 2:
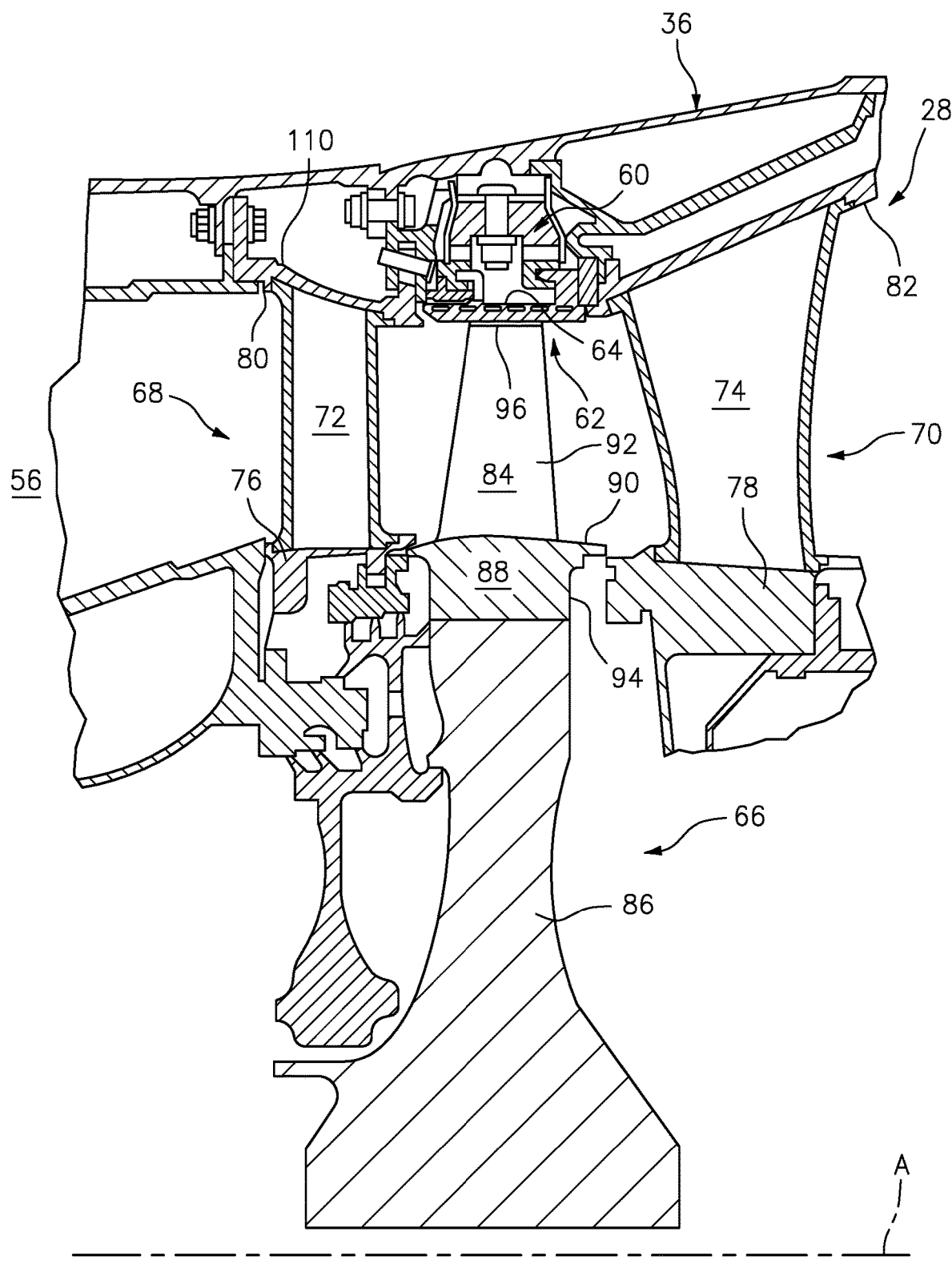
FIG. 2 is an enlarged schematic cross-section of an engine turbine section.

With reference to FIG. 2, an enlarged schematic view of a portion of the turbine section 28 is shown by way of example; however, other engine sections will also benefit herefrom. A shroud assembly 60 within the engine case structure 36 supports a blade outer air seal (BOAS) assembly 62 with a multiple of circumferentially distributed BOAS 64 proximate to a rotor assembly 66 (one schematically shown).

The shroud assembly 60 and the BOAS assembly 62 are axially disposed between a forward stationary vane ring 68 and an aft stationary vane ring 70. Each vane ring 68, 70 includes an array of vanes 72, 74 that extend between a respective inner vane platform 76, 78 and an outer vane platform 80, 82. The outer vane platforms 80, 82 are attached to the engine case structure 36.

The rotor assembly 66 includes an array of blades 84 circumferentially disposed around a disk 86. Each blade 84 includes a root 88, a platform 90 and an airfoil 92 (also shown in FIG. 3). The blade roots 88 are received within a rim 94 of the disk 86 and the airfoils 92 extend radially outward such that a tip 96 of each airfoil 92 is closest to the blade outer air seal (BOAS) assembly 62. The platform 90 separates a gas path side inclusive of the airfoil 92 and a non-gas path side inclusive of the root 88.

Figure 3:
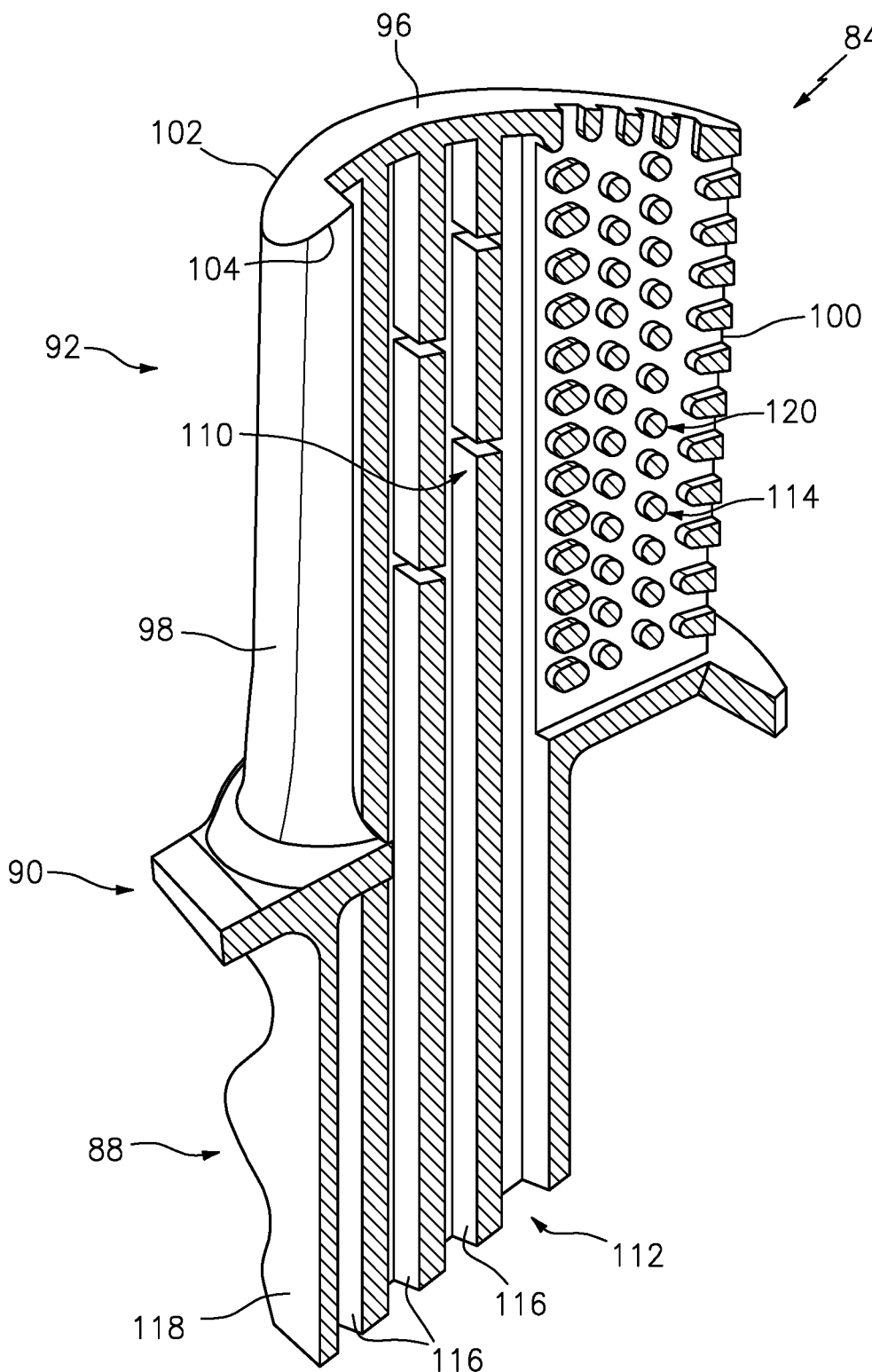
FIG. 3 is a perspective view of an airfoil as an example component for use with a coating method showing the internal architecture.

With reference to FIG. 3, the platform 90 generally separates the root 88 and the airfoil 92 to define an inner boundary of a gas path. The airfoil 92 defines a blade chord between a leading edge 98, which may include various forward and/or aft sweep configurations, and a trailing edge 100. A first sidewall 102 that may be convex to define a suction side, and a second sidewall 104 that may be concave to define a pressure side are joined at the leading edge 98 and at the axially spaced trailing edge 100. The tip 96 extends between the sidewalls 102, 104 opposite the platform 90. It should be appreciated that the tip 96 may include a recessed portion.

To resist the high temperature stress environment in the gas path of a turbine engine, each blade 84 may be formed by casting. It should be appreciated that although a blade 84 with an array of internal passageways 110 (shown schematically) will be described and illustrated in detail, other components including, but not limited to, vanes, turbine shrouds, combustor liners, and end walls. Other components which are coated will also benefit from the teachings herein.

The external airfoil surface may be protected by a coating that overlies and contacts the external airfoil surface. Such coatings may be of the MCrAlX type. The terminology "MCrAlX" is a shorthand term of art for a variety of families of overlay protective layers that may be employed as environmental coatings or bond coats in thermal barrier coating systems. In this, and other forms, M refers to nickel, cobalt, iron, and combinations thereof. In some of these protective coatings, the chromium may be omitted. The X denotes elements such as hafnium, zirconium, yttrium, tantalum, rhenium, ruthenium, palladium, platinum, silicon, titanium, boron, carbon, and combinations thereof. Specific compositions are known in the art. Optionally, a ceramic layer overlies and contacts the protective layer. The ceramic layer is preferably yttria-stabilized zirconia, which is a zirconium oxide. Other operable ceramic materials may be used as well. Typically, when there is no ceramic layer present, the protective layer is termed an "environmental coating." When there is a ceramic layer present, the protective layer is termed a "bond coat."

Figure 4:
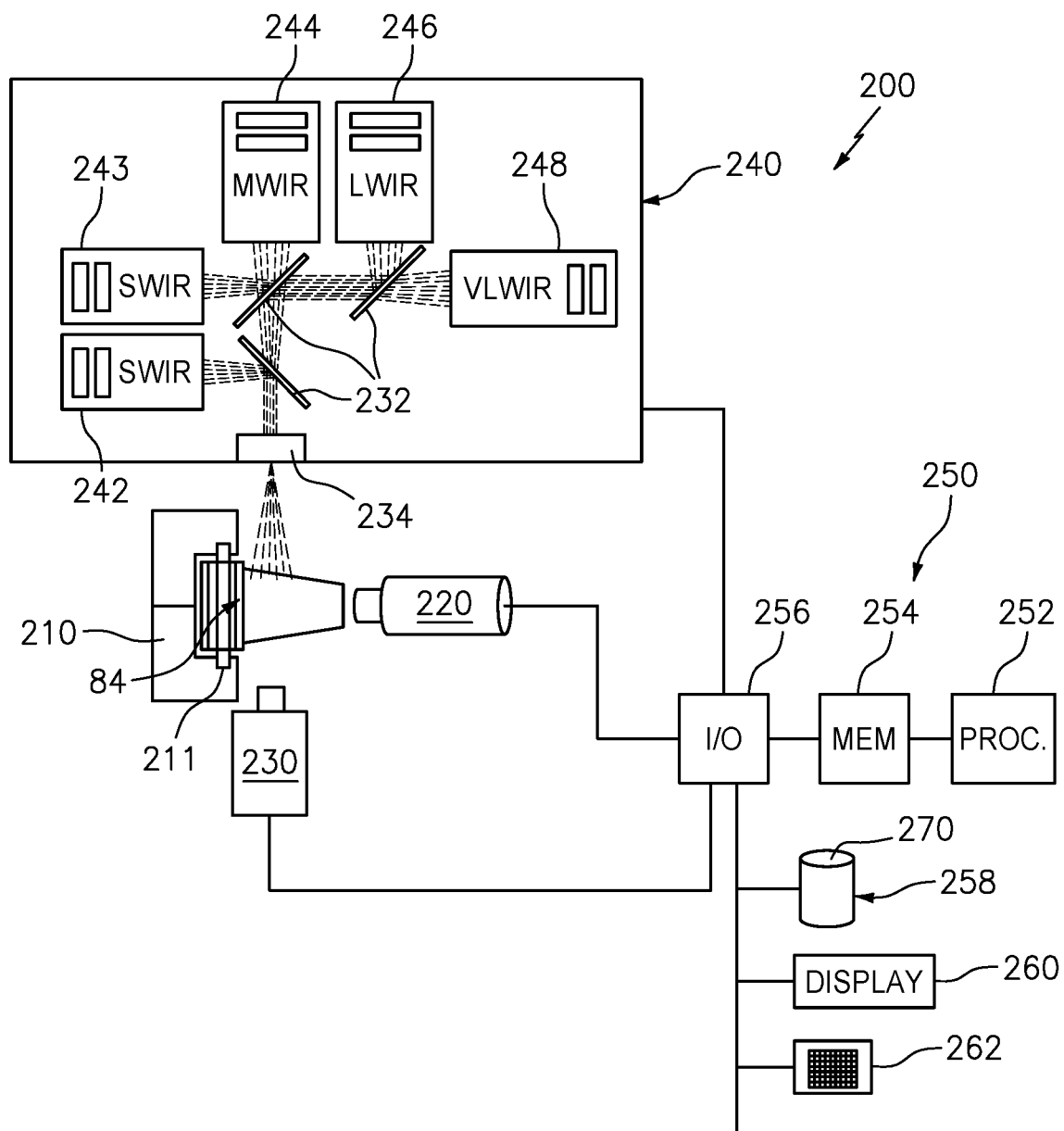
FIG. 4 is a schematic view of a nondestructive multispectral vibrothermography inspection system.

With reference to FIG. 4, a nondestructive multispectral vibrothermography inspection system 200 combines multispectral thermal imaging techniques with multi-frequency vibrothermography to produce a nondestructive inspection technique that does not require stripping of environmental barrier coatings or thermal barrier coating systems.

The nondestructive multispectral vibrothermography inspection system 200 includes a fixture 210 to retain a component such as the blade 84, an ultrasonic excitation source 220, a sensor 230, a multispectral thermography system 240, and a control system 250. The source of heat necessary for the disclosed thermographic method is generated by the ultrasonic excitation source 220 that is capable of generating a broad range of frequencies, from 20 kHz up to 2 MHz.

The multispectral thermography system 240, for example, includes a multispectral spectrometer operable to acquire radiation over a wide spectral signature, for example from 0.5 to 22 μm in wavelength. In one example, the multispectral thermography system 240 may include a Near infrared (NIR) module 243, a short-wave infrared (SWIR) module 242, a mid-wave infrared (MWIR) module 244, a long-wave infrared (LWIR) module 246, and a very long-wave infrared (VLWIR) module 248 that utilize beam splitters 232 to view a component such as an example blade 84 through a single lens 234. Near infrared typically refers to non-visible light falling between 750 and 1000 nanometers (nm). Short-wave infrared (SWIR) typically refers to nonvisible light falling between 1000 and 3000 nanometers (nm) in wavelength. Mid-wave infrared (MWIR) is a subset of the infrared band of the electromagnetic spectrum, typically covering the wavelengths ranging from 3 μm to 5 μm (3000 nm to 5000 nm). Long-wave infrared (LWIR) is a subset of the infrared band of the electromagnetic spectrum, typically covering the wavelengths ranging from the wavelengths ranging from 8 μm to 14 μm (8000 nm to 14000 nm). Very long-wave infrared (VLWIR) is a subset of the infrared band of the electromagnetic spectrum, typically covering the wavelengths ranging from the wavelengths ranging from the 12 μm to 22 μm (12000 nm to 22000 nm). In alternative embodiments, parallel optical channels are used with bandpass filters to separate or sub-separate the multispectral bands. In yet another embodiment, a multispectral random imaging camera may be used.

The control 250 includes at least one computing device, that may include hardware, firmware, and/or software components that are configured to perform the functions disclosed herein, including the operation of the ultrasonic excitation source 220, the sensor 230, and the multispectral thermography system 240. While not specifically shown, the control 250 may include other computing devices (e.g., servers, mobile computing devices, etc.) and computer aided manufacturer (CAM) systems which may be in communication with each other and/or the control 250 via a communication network to perform one or more of the disclosed functions.

The control 250 may include at least one processor 252 (e.g., a controller, microprocessor, microcontroller, digital signal processor, etc.), memory 254, and an input/output (I/O) subsystem 256. The control 250 may be embodied as any type of computing device (e.g., a tablet computer, smart phone, body-mounted device or wearable device, etc.), a server, an enterprise computer system, a network of computers, a combination of computers and other electronic devices, or other electronic devices. Although not specifically shown, the I/O subsystem 256 typically includes, for example, an I/O controller, a memory controller, and one or more I/O ports. The processor 252 and the I/O subsystem 256 are communicatively coupled to the memory 254. The memory 254 may be embodied as any type of computer memory device (e.g., volatile memory such as various forms of random access memory).

The I/O subsystem 256 may also be communicatively coupled to a number of hardware, firmware, and/or software components, including a data storage device 258, a display 260, and a user interface (UI) subsystem 262. The data storage device 258 may include one or more hard drives or other suitable persistent storage devices (e.g., flash memory, memory cards, memory sticks, and/or others). A database 270 for the ultrasonic excitation source 220, the sensor 230, and the multispectral thermography system 240 may reside at least temporarily in the data storage device 258 and/or other data storage devices (e.g., data storage devices that are "in the cloud" or otherwise connected to the control 250 by a network).

Figure 5:
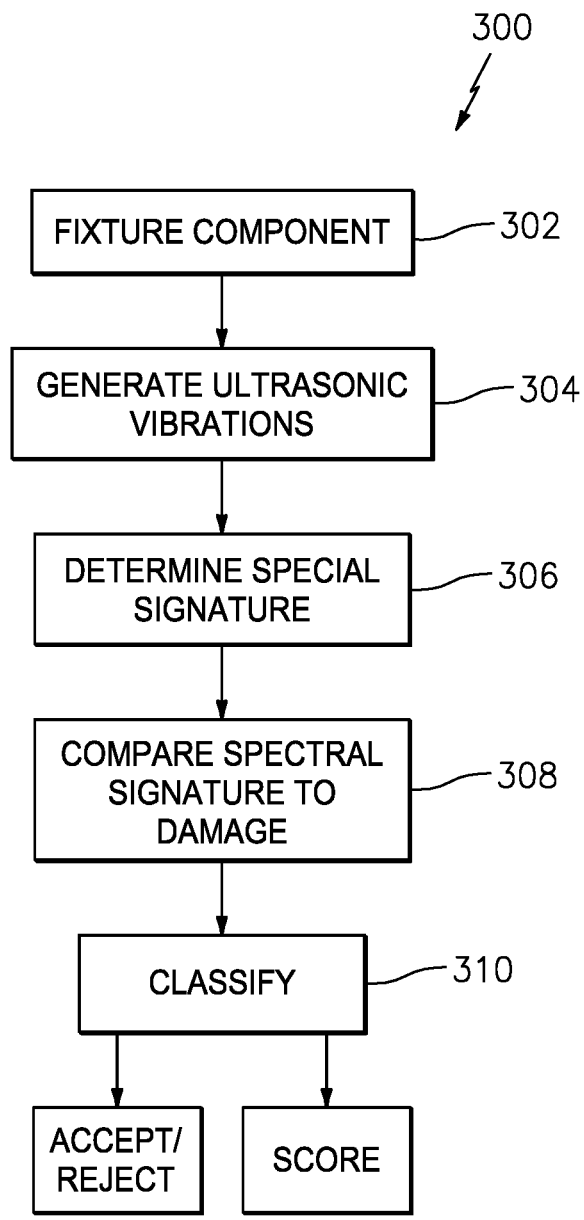
FIG. 5 is a block diagram representing a method of inspection using the nondestructive multispectral vibrothermography inspection system.

With reference to FIG. 5, one disclosed non-limiting embodiment of a method 300 for nondestructive component inspection of a component such as the blade 84 (FIG. 3) initially includes locating the component in the fixture 210 of the nondestructive multispectral vibrothermography inspection system 200 (step 302). The component such as the blade 84 is mounted to remove the effect of the fixture 201 on the component's natural vibrational response, such as with rubber pins or other such dampers 211 (FIG. 4) in the clamping fixture 210.

The contact between the ultrasonic excitation source 220 and the component under inspection induces elastic waves in the component such that each single frequency of excitation is converted into a broad band of frequencies which are particular to resonant frequencies of the component (step 304). This vibrational energy is dissipated through conversion into heat due to friction or plastic deformation at damage sites, such as crack tips, flaws, defects, contacts, and others in the metal, ceramic, and/or composite substrate of the component.

The spectral signature is then observed with the multispectral thermography system 240 (step 306). The amount of heat generated depends on the frequency and position of the excitation source and the size, shape, orientation and depth of the dissipation site, as well as the excitation power level. Multispectral infrared methods are a powerful technique used for the accurate measurement of temperature on the surface of coated hot section components. Multispectral methods involve the reading thermal radiation intensities at two or more different wavelengths. Measurements at more wavelengths allow for even more information to be determined, such as reflectivity, as well as the variation of emissivity and reflectivity versus temperature. As the TBC and EBC materials are at least partially translucent to thermal radiation, the transmissivity of the coating and its variation with respect to temperature can be determined by the multispectral thermography system 240. The spectral signature represents thermal radiation emitted at the surface of the coating, the radiation emitted by the coating material, as well as the metal alloy substrate underneath the coating. Multispectral imaging techniques have the potential to measure not only temperature, but also temperature gradient, as well as the condition of the coating and substrate due to erosion, cracking, delamination, and coating spallation.

Figure 6:
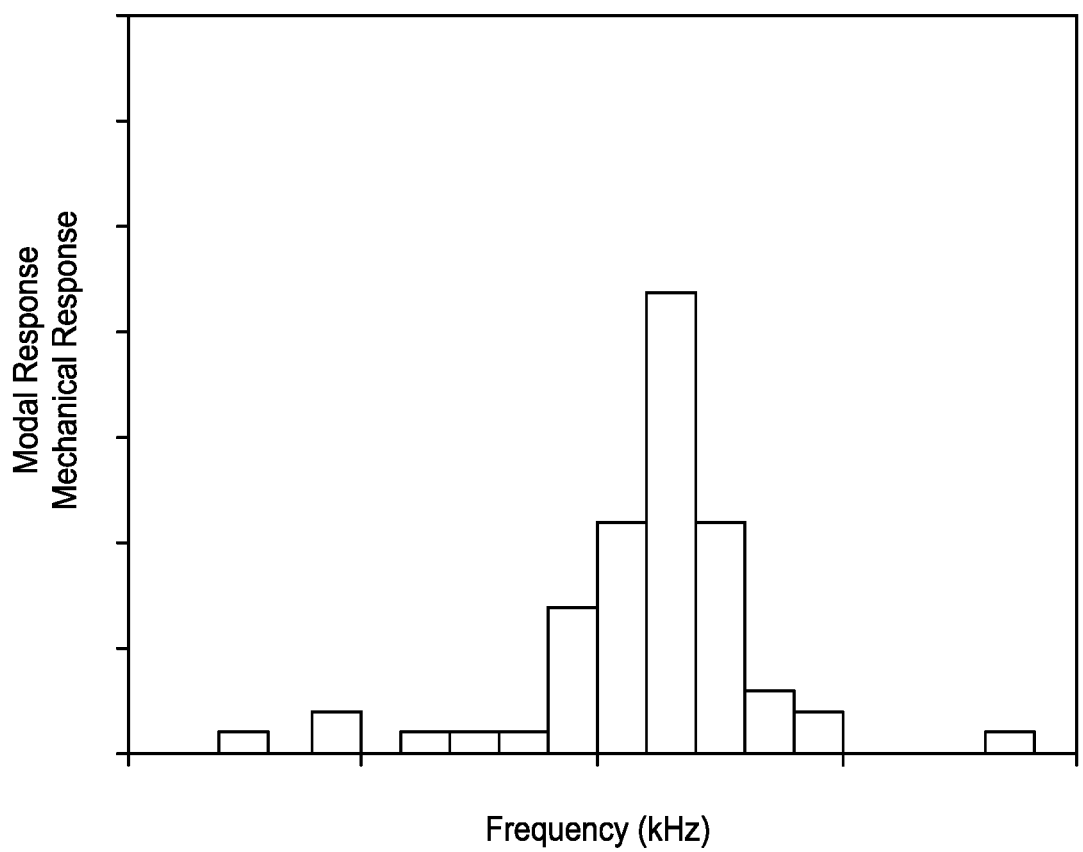
FIG. 6 is a representation of a waveform from the nondestructive multispectral vibrothermography inspection system shown as a histogram that compares a frequency with a modal response.

The sensor 230 measures the surface velocities as functions of time, which are transformed into distributions of amplitudes versus resonant frequencies of the component for each excitation frequency and power level of the excitation source. That is, a waveform from the nondestructive multispectral vibrothermography inspection system may be output as a histogram (FIG. 6) that compares a frequency with a modal response. The modal response is often referred to as a mechanical response or "bin size" in response to excitation.

A number of spectral signatures are collected and stored, one for each ultrasonic excitation frequency in the database 270. Each set of waveforms provides a "fingerprint" or "genetic code" of the particular component being inspected. This provides a relation between the vibrational stresses in the component to the spectral signature therefrom. Correlated data for the component under inspection is thereby developed.

The spectral signature may require post processing for noise removal, image enhancement, removal of bad pixels, non-uniformity correction (NUC), and masking for vignetting effects of the thermographic images. In one embodiment, the noise removal, bad pixel compensation, and image enhancement may be advantageously achieved with sparse learned dictionary approaches. The spectral energy distribution of the thermal radiation and waveform are collected versus the wavelengths measured by the imaging system and for all excitation frequencies and power levels.

The spectral signatures may be normalized and compared (step 308) quantitatively with those in the database 270 of known damaged and undamaged components. Independent and potentially destructive inspections of a number of known damaged and undamaged components may be utilized to initially build the data in the database 270 to provide a baseline or ground-truth. That is, multiple damaged and undamaged components are initially scanned using the multispectral vibrothermography inspection system 200. In one embodiment, the classification algorithm learns from the ground truth database 270 and can be updated incrementally as additional ground truth data becomes available. This data may then be used by a learning algorithm (supervised, semi-supervised, or unsupervised) which is trained to determine if a particular component will be accepted or rejected when compared. The initial learning and subsequent updating may be by gradient-based contrastive divergence, greedy algorithms, backpropagation, generative adversarial learning, K-SVD algorithm, and the like.

Next, image recognition algorithms are utilized by the control 250 to compare the spectral signature of the component under inspection against the spectral signature data in the database 270 for classification (step 310). The component under inspection can be classified into binary (e.g. reject, accept) or multi-class categories (e.g., a score or a probability distribution over damage modes), using algorithms such as a logistics regression, nearest neighbor metrics, deep neural networks, Bayesian estimation, support vector machines, decision trees, random forests, sparsity-exploiting optimization, and the like.

The nondestructive multispectral vibrothermography inspection system 200 permits inspection of components without removing their coatings in order to determine the existence of cracks, flaws, corrosion, and erosion, as well as crack morphology and dimensions, and to determine if a component is repairable before the expensive coating stripping process. The nondestructive multispectral vibrothermography inspection system 200 is operable to detect, for example, TBC porosity, properties and thickness of the thermally grown oxide (TGO) layer between the TBC and alloy, and damage and erosion to the TBC.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward", "aft", "upper", "lower", "above", "below", and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed is:

1. A nondestructive multispectral vibrothermography inspection system to inspect a component without removal of a coating thereon, the system comprising:
   a fixture to retain a component;
   an ultrasonic excitation source directed toward the component to generate ultrasonic excitations in the component over a plurality of excitation frequencies between 20 kHz to 2 MHz;
   a sensor directed toward the component to measure the natural vibrational modes of the component as surface velocity generated by the ultrasonic excitations;
   a multispectral thermography system directed toward the component to determine a spectral signature in the component from the excitations, wherein the multispectral thermography system comprises a plurality of a near infrared (NIR) module, a short-wave infrared (SWIR) module, a mid-wave infrared (MWIR) module, a long-wave infrared (LWIR) module, and a very long-wave infrared (VLWIR) module, the spectral signature from 0.5 to 22 μm in wavelength, one for each of the plurality of ultrasonic excitation frequencies to provide a relation between the vibrational stresses in the component to the spectral signature;
   a controller operable to classify the component based on a correlation between the surface velocities from the excitations and the spectral signature in the component from the excitations;
   a database of the correlations between vibrational frequencies of a multiple of components and the spectral signature thereof; and
   an image recognition algorithm to match the spectral signature of the component against a database that contains the spectral signature of previously inspected components known to have either failed or passed the inspection.

2. The system as recited in claim 1, wherein the fixture comprises dampers that minimize the effect of the fixture in response to ultrasonic excitation from the ultrasonic excitation source.

3. The system as recited in claim 1, wherein the multispectral thermography system is operable to view radiation over a range of the spectral signature.

4. The system as recited in claim 1, wherein the spectral signature is from 0.5 to 14.5 μm in wavelength.

5. The system as recited in claim 1, wherein the database of the correlations is utilized to score a component being inspected.

6. The system as recited in claim 1, wherein the component comprises an airfoil.

7. The system as recited in claim 1, further comprising one or more beam splitters to view the component through a single lens.

8. The system as recited in claim 1, wherein the fixture comprises rubber pins that minimize the effect of the fixture in response to ultrasonic excitation from the ultrasonic excitation source.

9. A method for nondestructive multispectral vibrothermography inspection of a component without removal of a coating thereon, the method comprising:
   generating ultrasonic excitations in a component over a plurality of frequencies from 20 kHz to 2 MHz;
   determining a spectral signature in the component from the excitations, wherein the multispectral thermography system comprises a near infrared (NIR) module, a short-wave infrared (SWIR) module, a mid-wave infrared (MWIR) module, a long-wave infrared (LWIR) module, and a very long-wave infrared (VLWIR) module, the spectral signature is from 0.5 to 22 μm in wavelength, one for each of the plurality of ultrasonic excitation frequencies to provide a relation between the vibrational stresses in the component to the spectral signature;
   determining a correlation between the surface velocities from the excitations and the spectral signature in the component from the excitations;
   comparing the correlation against a database that contains the spectral signature of previously inspected components known to have either failed or passed the inspection; and
   classifying the component based on the spectral signature.

10. The method as recited in claim 9, wherein classifying the component comprises identifying whether the component is acceptable or unacceptable.

11. The method as recited in claim 9, wherein classifying the component comprises scoring the component.

12. The method as recited in claim 9, further comprising damping the component within a fixture.

13. The method as recited in claim 9, wherein contact between the ultrasonic excitation source and the component under inspection induces elastic waves in the component, each single frequency of excitation is converted into a broad band of frequencies which are particular to resonant frequencies of the component.

14. The method as recited in claim 9, wherein a classification algorithm for classifying the component based on the spectral signature learns from a ground truth database that is updated incrementally as additional ground truth data becomes available.

* * * * *